United States Patent [19]

Sontheimer

[11] 4,445,828
[45] May 1, 1984

[54] FUEL INJECTION PUMP FOR INTERNAL COMBUSTION ENGINES

[75] Inventor: Karl Sontheimer, Stuttgart, Fed. Rep. of Germany

[73] Assignee: Robert Bosch GmbH, Stuttgart, Fed. Rep. of Germany

[21] Appl. No.: 397,969

[22] Filed: Jul. 14, 1982

[30] Foreign Application Priority Data

Sep. 16, 1981 [DE] Fed. Rep. of Germany ....... 3136751

[51] Int. Cl.³ ............................................ F02M 59/44
[52] U.S. Cl. ..................................... 417/490; 417/499
[58] Field of Search ............... 417/490, 494, 499, 501, 417/510; 123/495, 500, 501, 503

[56] References Cited

U.S. PATENT DOCUMENTS

| | | |
|---|---|---|
| 2,265,997 | 12/1941 | Bremser . |
| 2,571,501 | 10/1951 | Truxell .............................. 299/107.2 |
| 3,885,895 | 5/1975 | Staudt et al. .......................... 417/499 |
| 3,945,773 | 3/1976 | Vuaille ................................ 417/494 |
| 3,985,474 | 10/1976 | Vuaille ................................ 417/490 |

FOREIGN PATENT DOCUMENTS 1172897  6/1964  Fed. Rep. of Germany .
1318296  1/1963  France ................................ 417/501
1365247  5/1964  France ................................ 417/494

Primary Examiner—Leonard E. Smith
Attorney, Agent, or Firm—Edwin E. Greigg

[57] ABSTRACT

In order to prevent erosion of the pump housing caused by the fuel stream exiting from the return flow openings at the end of injection, it is proposed that the fuel injection pump be provided with an impact protection ring pushed over the cylinder bushing. Adjacent to a cylindrical wall portion, the impact protection ring carries a radially outwardly bent, circular-annular collar. The collar rests on an abutment shoulder disposed above the return flow openings and has an end face whose area is a multiple of the cross sectional area of the cylindrical wall portion. The impact protection ring encloses an annular chamber, provided with a narrow radial gap (s), in the vicinity of the return flow opening and is pressed by a snap ring against the abutment shoulder. As a result of the pressure build-up in the annular chamber and as a result of a slide bearing effect between the collar and the abutment shoulder, a rotational movement of the impact protection ring triggered by the obliquely exiting fuel stream is assured, for the purpose of attaining long service life of the fuel injection pump.

5 Claims, 1 Drawing Figure

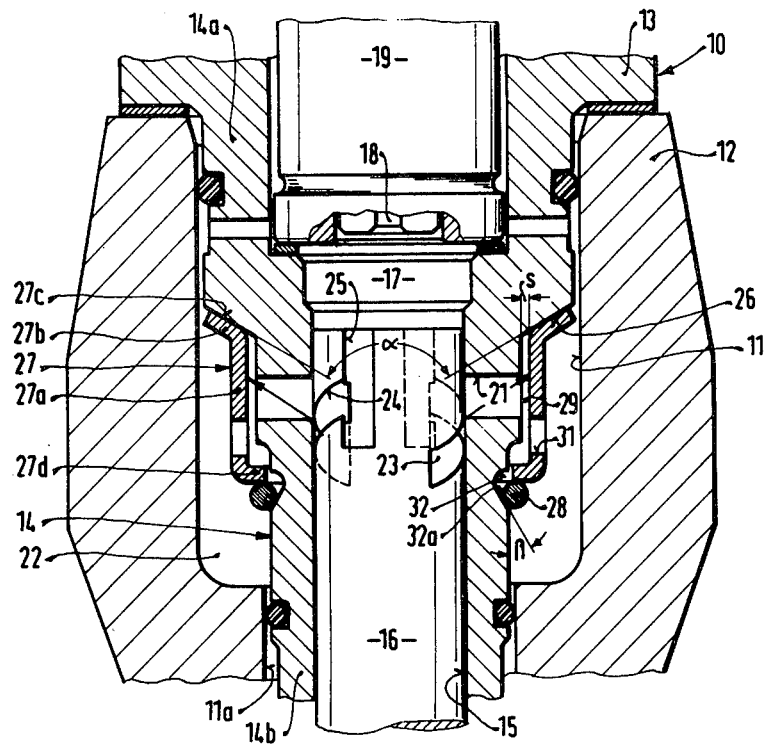

FUEL INJECTION PUMP FOR INTERNAL COMBUSTION ENGINES

BACKGROUND OF THE INVENTION

The invention is based on a fuel injection pump as generally described by the preamble to the main claim. A fuel injection pump of this type is already known from German Pat. No. 11 72 897, the impact protection ring of which is drawn from sheet steel and is pressed by a snap ring, acting as a holder means, against an end face of a holder bushing embodied as an abutment shoulder. Given the previously conventional injection pressures, such a protection ring was completely satisfactory, and the hardened surface of the ring resisted the impact energy of the fuel stream leaving the return flow opening at the end of injection. However, it has been found that with the increase in injection pressures required for modern direct-injection engines, the impact protection rings previously used are destroyed in the course of time; the fuel stream which exits with extremely high energy wears off the surface of the inner wall of the impact protection ring by erosion until the wall has been broken through. Subsequently, the pump housing, which is normally of aluminum, is destroyed very rapidly by the fuel stream, which is no longer hindered by the protection ring.

Longer service life of the impact protection ring and thus a longer life of the injection pumps can be attained if the impact protection ring executes a rotary movement during operation, so that new wall locations are continually being presented to the fuel stream. Such a rotary movement was demonstrated in some cases, but in the known rings it took place only occasionally; a rotary movement which was made automatic by appropriate means and which took place under all operating conditions was not previously attainable.

From German Offenlegungsschrift No. 24 42 010 and German Offenlegungsschrift No. 24 42 088, sheath-like impact protection rings have become known which were built in with play both in the axial and the radial directions in order to enable a rotary movement. In these fuel injection pumps, the danger exists that oscillations on the part of the impact protection rings caused by the existing play will destroy the adjacent abutment faces and also the end faces of the rings very rapidly; a reliable rotary movement occurring under all conditions could not be observed. In the slotted embodiment of the known ring according to German Offenlegungsschrift No. 24 42 010, the danger exists that the gap existing at the connecting point of the ring presents a face which the fuel stream can act upon, and the gap experiences the flow through it of fuel.

OBJECT AND SUMMARY OF THE INVENTION

It is the object of the invention to develop an impact protection ring in which by appropriate means it is possible to obtain rotation of the rings which can be observed in every operating state, which is controllable in accordance with operating principles and which is reliable.

In the fuel injection pump according to the invention revealed hereinafter, the radially outwardly bent, circular-annular collar forms an axial slide bearing for the impact protection ring, whose coeffient of friction is reduced to such an extent by the fuel squeezed through it that despite the pressure force exerted by the holder means, the circumferential component of the obliquely arriving fuel stream reliably sets the ring to rotating. The end face of the collar, which is larger than the cross sectional area of the ring, generates in the contact faces embodied by the abutment shoulder a labyrinthine effect, which negates the exiting energy of the fuel, so that in an advantageous manner the fuel is prevented from bypassing the flowthrough openings.

With the provisions disclosed in the dependent claims, advantageous further embodiments of and improvements to the impact protection ring of the fuel injection pump defined in the main claim can be attained. By means of the characteristics of claim 2, not only is the surface of the collar acting as a slide bearing enlarged, but also the funnel-like embodiment simultaneously serves to center the ring and simplifies its fabrication. In a fuel injection pump embodied as in claim 1 or 2, having flow through openings in the impact protection ring axially offset with respect to the return flow openings, it is attained by means of the characteristics of claim 3 that the pressure build-up in the annular chamber attained by means of the narrow gap presses a portion of the returning fuel into the gap face between the abutment shoulder and the collar of the impact protection ring, thus improving the slide bearing effect of the faces in contact with one another, and reinforcing the rotary movement of the ring.

In a fuel injection pump embodied in accordance with claim 3, in which the impact protection ring is guided on the cylinder bushing with a radially inwardly bent collar and is subjected to the action of a snap ring in the axial direction, which is set into an annular groove provided with a conical abutment face in the outer circumference of the cylinder bushing (see German Pat. No. 11 72 897 already cited), the characteristics disclosed in claim 4 assure satisfactory function of the rotating impact protection ring. With the material claimed in claim 5 and with the aid of the method steps disclosed in claim 6 for manufacturing the impact protection ring, a thoroughly hardened impact protection ring is now attained for the first time, which offers the advantages of maximum resistance to wear, reliably controllable heat treatment, and favorable fabrication cost.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows one exemplary embodiment of the invention in the form of a longitudinal section taken through the portion of a pumping element essential to the invention of a fuel injection pump for internal conbustion engines.

DESCRIPTION OF THE EXEMPLARY EMBODIMENT

The pumping element 10 shown only in part in the drawing is set into an offset reception bore 11 of a pump housing 12 cast of aluminum and secured in the illustrated example by means of a flange 13 in a known manner. The flange 13 is molded onto a cylinder bushing 14, in the cylinder bore 15 of which a pump piston 16 is guided both axially and rotationally movably. The pump work chamber 17 defined on one side as part of the cylinder bore 15 by the pump piston 16 is sealed off on the other side toward the supply side by a pressure valve housing 19 containing a pressure valve 18, both latter elements being of known design and shown only in part. The pump work chamber 17 communicates via two diametrically opposed control bores 21 which serve as both intake and return flow openings with a return flow chamber 22 also acting as the suction chamber, into which fuel set at inlet pressure by a pre-supply pump flows via a fuel inlet line not shown in further detail.

Two recesses 23 embodied as oblique grooves are cut into the jacket face of the pump piston 16, and their limitation oriented toward the pump work chamber 17 forms a control edge 24 with the jacket face of the pump piston 16. Also, these recesses 23, one being in full lines and the other in dash lines, communicate continuously with the pump work chamber 17 via one stop groove 25 for each recess 23 cut into the pump piston 16 in the form of longitudinal grooves.

Naturally it is also possible for a longitudinal bore inside the pump piston 16 to connect the pump work chamber 17 with the recess 23 in place of the stop groove 25, and instead of the recess 23 forming the control edge 24, the control edge can also be milled or machined into the jacket face in the form of screw threads.

The cylinder bushing 14 is fitted into the enlarged part of the reception bore 11 with a part 14a of enlarged diameter and into the narrower part 11a of the reception bore 11 with a part 14b of reduced diameter. there being little play between the cylinder bushing 14 and the reception bore 11.

At the transition between the two parts 14a and 14b of the cylinder bushing 14, there is a chamfered abutment shoulder 26, which is turned onto the cylinder bushing 14 at a conical angle of $\alpha = 120°$. An impact protection ring 27 is pushed onto the part 14b of the cylinder bushing of reduced diameter, being pressed by a snap ring 28 which serves as the holder means against the abutment shoulder 26, which is machined onto the cylinder bushing 14 above the return flow openings 21 as viewed in the pumping direction.

With a cylindrical wall portion 27a, the impact protection ring 27 encloses an annular chamber 29 in the vicinity of the return flow openings 21, and the annular chamber 29 connects the return flow openings 21 with the return flow chamber 22 via flowthrough openings 31 in the wall portion 27a which are axially offset with respect to the return flow openings 21. Adjacent to its cylindrical wall portion 27a, the impact protection ring 27 has an approximately radially outwardly bent circular-annular collar 27b, which in the illustrated example is molded to achieve a funnel-like form on the ring 27 at a conical angle $\alpha$ of approximately 120° and rests on the abutment shoulder 26. The collar 27b of the impact protection ring 27 has an end face 27c which has been enlarged by a multiple of the cross sectional area of the cylindrical wall portion 27a, this end face 27c resting precisely parallel to the abutment shoulder 26, and the two elements together form a slide bearing for the impact protection ring 27, as will be described later.

The annular chamber 29 enclosed by the impact protection ring 27 forms a very narrow radial gap, whose width s, in the case of fuel injection pumps fabricated in very great quantity and used for motor vehicle engines, is preferably between 0.4 and 1.2 mm. The volume of this annular chamber 29 and the outlet cross section at the flow-through openings 31 are adapted to one another such that an elevated pressure in the annular chamber 29 as compared with the pressure in the return flow chamber 22 is built up by means of the fuel leaving the return flow openings 21. As a result of this pressure, fuel is pressed into the gap between the end face 27c and the abutment shoulder 26, there forming a fuel film and thus providing an axial slide bearing for the impact protection ring 27. To prevent the impact protection ring 27 from lifting away from the abutment shoulder 26 in an uncontrolled fashion, the snap ring 28 is set into an annular groove 32, provided with a conical abutment face 32a, in the outer circumference of the cylinder bushing 14. The inclination angle $\beta$ of the conical abutment face 32a and the prestressing force of the snap ring 28 are adapted to one another such that they hold the impact protection ring 27 without play against the abutment shoulder 26, yet they still permit a rotational movement on the part of the impact protection ring 27 triggered by the returning flow stream of the fuel and by the pressure build-up in the annular chamber 29. In order to transmit the axial force onto the impact protection ring 27, the impact protection ring has an inwardly bent collar 27d on its end oriented toward the snap ring 28, with which collar it is guided on the part 14b of reduced diameter of the cylinder bushing 14.

As a result of the very narrow gap s for attaining the necessary pressure buildup in the annular chamber 29, it is possible to embody the outwardly directed collar 27a of the impact protection ring 27 with a sufficiently large end face 27c that the diameter of existing cylinder bushings does not have to be modified. As a result, the impact protection ring 27 embodied in accordance with the invention can be used with virtually all available pump types by making a slight change in the pumping element, for example by providing the abutment shoulder 26 by means of a metal turning operation.

The abutment shoulder 26 does not need to be provided directly on the cylinder bushing 14 as in the illustrated exemplary embodiment; instead it may be embodied by the end face of a holder bushing or by an appropriately embodied abutment shoulder in some other securing element.

The impact protection ring 27 is fabricated of ball bearing sheet steel, capable of being deep drawn and preferably 1.2 mm thick, meeting the specification V Tz 100Cr6 of the Krupp Company in Essen, Federal Republic of Germany. It can be given its final shape by means of cold deep drawing, the flowthrough openings 31 then being stamped out on a special tool, without later operations being required thereafter and the ring is thoroughly hardened. The thorough hardening method, not previously used, has the advantage of avoiding the danger of spotting, that is, of insufficiently hardened or still-soft points such as may occur with case-hardened elements. Thus a length of service life of the impact protection ring 27 can be attained which was previously impossible.

The compulsory rotational movement occurring in the described impact protection ring 27 is promoted by various factors. As indicated by an arrow inside the return flow openings 21, the fuel stream created at the end of injection leaves the recess 23 in the pump piston 16 in an oblique fashion and has a component acting in accordance with the inclination of the oblique control edge 24 in the circumferential direction of the impact protection ring 27 as well, so that the fuel stream arriving at the inner wall of the impact protection ring 27 imparts a rotary impulse to this impact protection ring.

However, this would not suffice in all cases to cause the impact protection ring to rotate, and it is only the already-described pressure build-up in the annular chamber 29 and the slide bearing formation in the gaps between the abutment shoulder 26 and the end face 27c as well as the defined pressure force exerted by the snap ring 28 which taken together provide an absolutely reliable rotational movement on the part of the ring 27.

The conical embodiment of the abutment shoulder 26 serves not only to enlarge the corresponding end face 27c of the impact protection ring 27 and to center it but also has the additional advantage that the transition between the two parts 14a and 14b of the cylinder bushing 14 can be embodied optimally in order to avoid fissures during grinding and machining of these elements.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A fuel injection pump for internal combustion engines having a cylinder bushing arranged to receive a pump piston, a pump piston in said bushing, said bushing further having at least one return flow opening for returning fuel flow controlled by said pump piston, and an impact protection ring positioned on said bushing, said impact protection ring being pressed by a holder means against an abutment shoulder located above said return flow opening in the pumping direction, said ring further having a cylindrical wall portion and an inner wall provided with means defining openings therethrough which enclose an annular chamber, said wall portion further having flowthrough openings in said inner wall arranged to connect said return flow opening with a return flow chamber, characterized in that said impact protection ring further includes adjacent to said cylindrical wall portion an at least approximately radially outwardly bent, circular-annular collar, which rests on said abutment shoulder and said collar has an end face enlarged in area by a multiple of the cross sectional area of said cylindrical wall portion.

2. A fuel injection pump as defined by claim 1, characterized in that said collar of said impact protection ring is embodied as funnel-like and preferably encloses a conical angle ($\alpha$) of approximately 120°.

3. A fuel injection pump as defined by claim 1 or 2, wherein said flowthrough openings are axially offset with respect to said return flow opening, characterized in that said annular chamber enclosed by the impact protection ring forms a narrow radial gap, the width (s) of which is preferably between 0.4 and 1.2 mm.

4. A fuel injection pump as defined by claim 1 in which said holder means for said impact protection ring includes a snap ring which is set into an annular groove which further includes a conical abutment face in said bushing, characterized in that said inclination angle ($\alpha$) of the conical abutment face and the prestressing force of said snap ring are adapted to one another such that they hold the impact protection ring against said abutment shoulder without play, whereby a rotational movement of the impact protection ring triggered by the return flow stream of the fuel and by the pressure buildup of the annular chamber is achieved.

5. A fuel injection pump as defined by claim 1, characterized in that said impact protection ring is fabricated of ball bearing sheet metal capable of being deep drawn, preferably 1.2 mm thick, and conforms to the specification V Tz 100Cr6 of the Krupp Company in Essen, Federal Republic of Germany.

* * * * *